United States Patent
Baker

(10) Patent No.: US 7,196,630 B2
(45) Date of Patent: Mar. 27, 2007

(54) METHOD AND APPARATUS FOR ROUTING A COMMUNICATION TO A USER BASED ON A PREDICTED PRESENCE

(75) Inventor: Al Baker, Lincroft, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 10/672,634

(22) Filed: Sep. 26, 2003

(65) Prior Publication Data

US 2005/0068166 A1    Mar. 31, 2005

(51) Int. Cl.
*G08B 23/00* (2006.01)

(52) U.S. Cl. ............. 340/573.1; 340/531; 340/539.13; 379/210.01

(58) Field of Classification Search ............... 340/531, 340/573.1, 539.13; 379/35, 7, 211.02, 100.08, 379/93.01, 210.01
See application file for complete search history.

(56) References Cited

U.S. PATENT DOCUMENTS

| | | | | |
|---|---|---|---|---|
| 4,839,916 A | * | 6/1989 | Fields et al. ................... | 379/13 |
| 5,825,864 A | * | 10/1998 | McGraw et al. ....... | 379/201.06 |
| 5,889,845 A | * | 3/1999 | Staples et al. ......... | 379/211.02 |
| 5,892,856 A | * | 4/1999 | Cooper et al. ............... | 382/291 |
| 5,933,778 A | * | 8/1999 | Buhrmann et al. ......... | 455/461 |
| 6,021,176 A | * | 2/2000 | McKendry et al. ........... | 379/35 |
| 6,130,938 A | * | 10/2000 | Erb ........................ | 379/211.02 |
| 6,625,449 B1 | * | 9/2003 | Naqvi et al. ................ | 455/428 |
| 7,006,833 B1 | * | 2/2006 | Contractor ............... | 455/456.1 |

* cited by examiner

*Primary Examiner*—Anh V. La
(74) *Attorney, Agent, or Firm*—Ryan, Mason & Lewis, LLP

(57) ABSTRACT

A method and apparatus are provided for analyzing a user's communication activity to determine presence patterns at one or more communication devices. A user's presence at one or more communication devices is monitored over time to detect at least one pattern of behavior indicating that a user is likely to be present at a given communication device during a particular time interval. Once a presence pattern is detected, a call that is destined for the user during the associated time interval can be automatically routed to the user at the given communication device. As a transition between each presence pattern is reached, i.e., when the user changes locations or devices, the probability of the user being present on one device decreases while the probability of the user being present on another device increases. According to another aspect of the present invention, the presence call processor can optionally send messages to multiple devices during these transitional times to ensure that the call is received by the intended recipient.

21 Claims, 5 Drawing Sheets

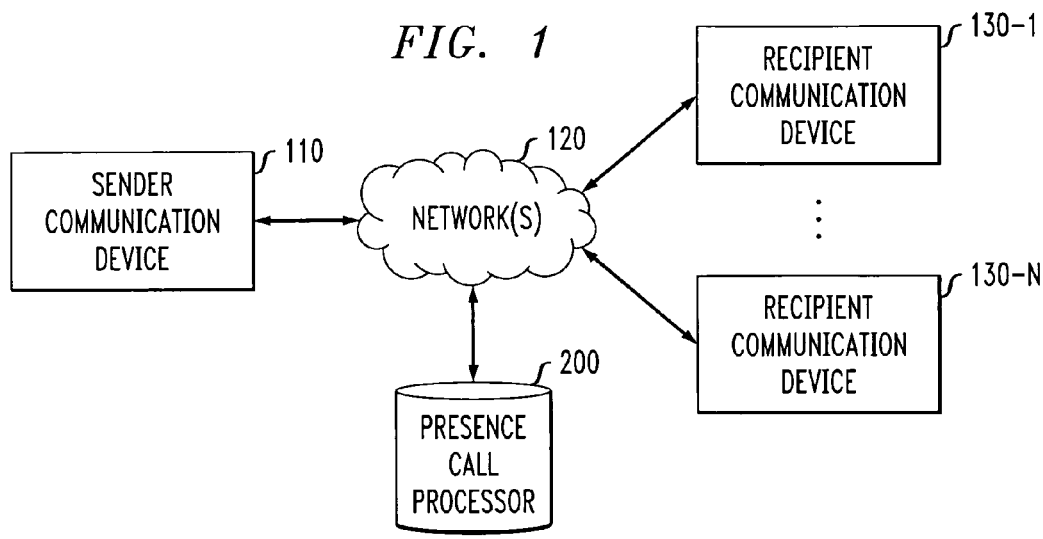
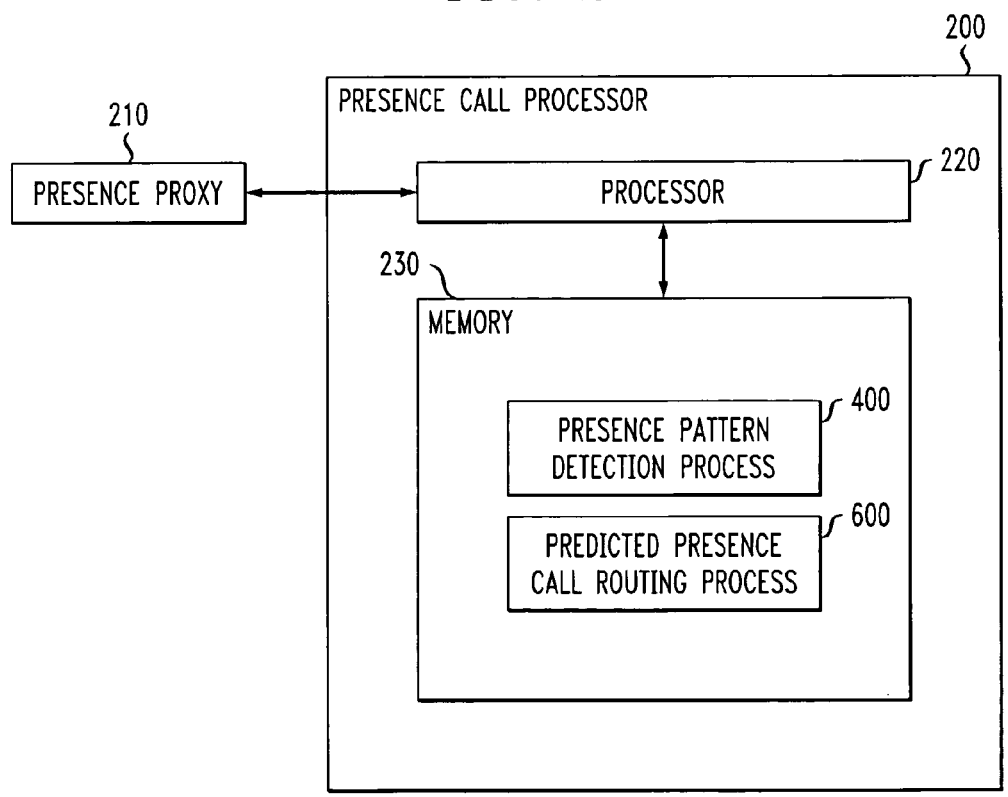

300

350

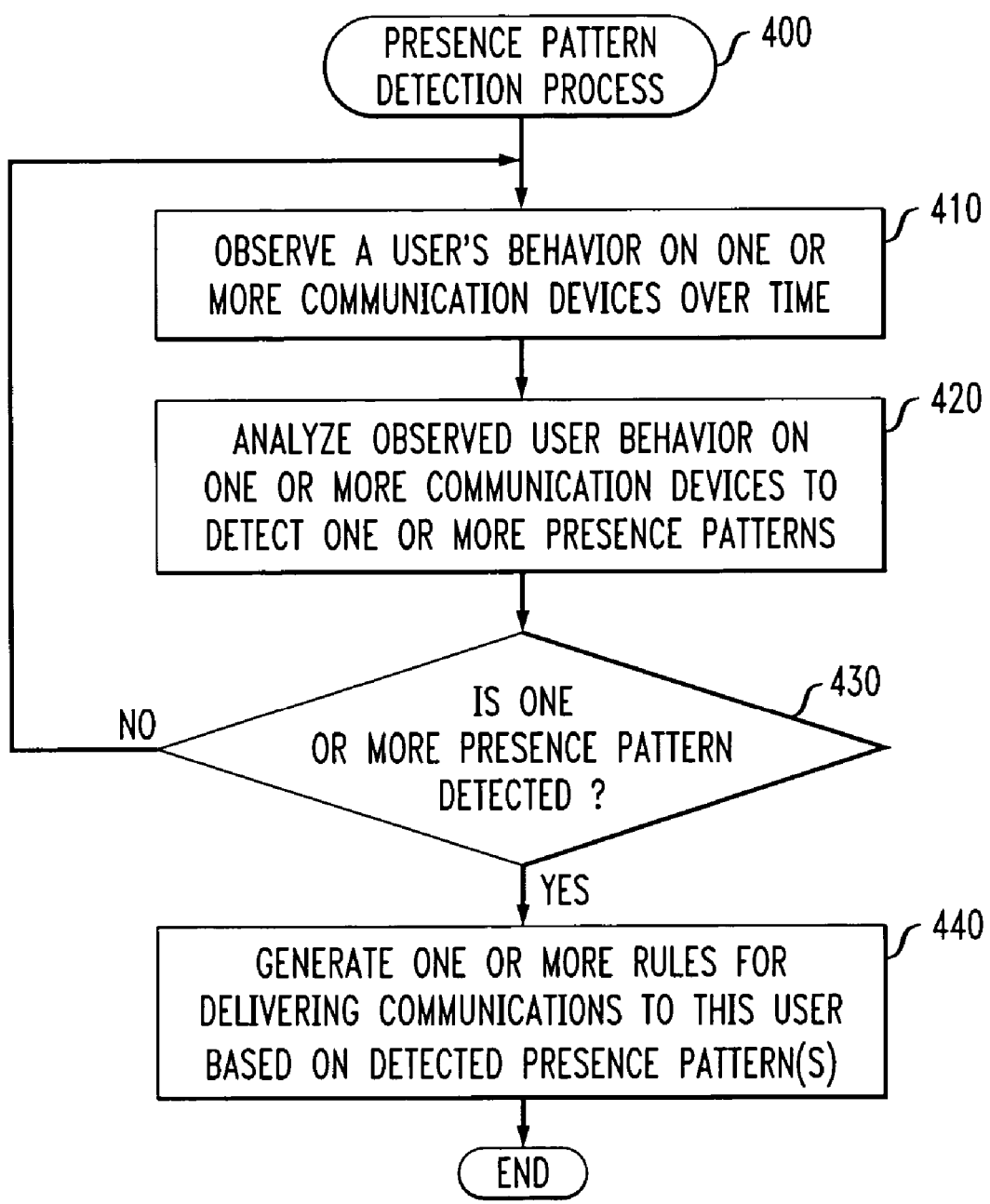

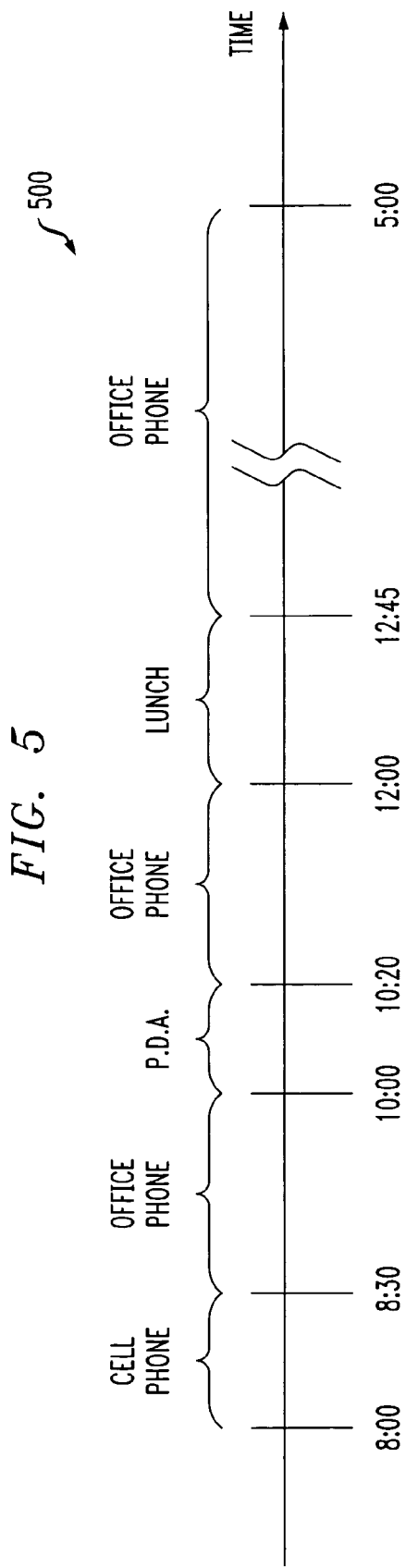

METHOD AND APPARATUS FOR ROUTING A COMMUNICATION TO A USER BASED ON A PREDICTED PRESENCE

CROSS-REFERENCE TO RELATED APPLICATIONS

The present application is related to United States Patent Application entitled "Programmable Presence Proxy for Determining a Presence Status of a User," U.S. Pat. Ser. No. 10/672,635, incorporated by reference herein.

FIELD OF THE INVENTION

The present invention relates generally to communication methods and systems, and more particularly, to methods and systems that deliver a communication based on the presence of a recipient.

BACKGROUND OF THE INVENTION

A number of techniques have been proposed or suggested for determining whether or not a person is "present" at a given device. See, for example, Atkins et al., "Introducing Instant Messaging and Presence Into the Workplace," Proc. of the Conf. on Human Factors in Computing Systems, Minneapolis, Minn., USA, ACM CHI 2002 (Apr. 20, 2002), downloadable from http://www.informatik.uni-trier.de/~ley/db/conf/chi/chi2002.html. As friends and colleagues become more distributed in time or location (or both), it becomes even more desirable for a user to determine, prior to a given communication attempt, whether or not the intended recipient of the contemplated communication is currently available at one or more communication devices. The provided presence information allows a user to make a more informed decision about how to best communicate with another person. In this manner, productivity is enhanced by enabling a better selection of the best way to contact the other person. If the other person is present for a real time communication, for example, the user can choose a real time or near real time mode of communication, such as a telephone call or an instant message. Otherwise, the user can select a non-real time mode of communicating, such as an email message, voice mail message or a page. This informed choice leads to a more efficient, productive and cost effective communication.

Instant messaging systems, for example, such as those offered by America Online (AOL), typically provide a mechanism for determining whether a message recipient is present. The presence information allows the recipient of an instant message to determine, for example, whether the sender of the instant message is currently available to receive additional instant messages. The presence information is generally determined based on user login activity (e.g., whether the user is currently logged on to the AOL service). Presence information based solely on login activity, however, can grow stale over time, since a user may remain logged in to an application for several days at a time. Thus, many systems supplement the user login activity with other determinable user activity, such as such as keyboard or mouse activity and whether a user remains idle for a time period exceeding a specified interval. Thus, existing presence awareness systems can distinguish between a user who is connected to the service (present) or not connected to the service (absent), and most systems allow some sort of busy or unavailable flag to be set. For example, some presence awareness systems have been extended to allow a user to affirmatively provide a personalized text message indicating his or her current availability, such as "out to lunch," or "in a meeting."

While existing presence awareness systems allow a user to make a more informed decision about how to best communicate with an intended recipient, they suffer from a number of limitations, which if overcome, could further improve the ability of users to efficiently communicate. In many cases, a user will not have the time or forethought to constantly change his or her presence status on one or more devices. Moreover, it is sometimes hard to infer the presence status of a user on a given device. For example, an enterprise telephone user may have multiple telephone lines. If a user is on a telephone call and another line rings, the user can either put the first caller on hold and answer the second line, or just ignore the second line. In this situation, it is difficult to infer the user's presence status based on his or her actions with regard to the second call line. Even if device status can be specific, such as the send-all-call button on the telephone, many users will still not invoke that feature before leaving the office, for example, to go out to lunch. Rather, users will typically merely pick up their cell phone and leave the office. In this case, the telephone and cell phone both appear to be present.

A need therefore exists for methods and systems that can route a communication to a user based on a presence pattern. A further need exists for a method and apparatus for routing a communication to a user based on a predicted presence of the user at one or more communication devices. Yet another need exists for a method and apparatus that can detect presence patterns of a user over time.

SUMMARY OF THE INVENTION

Generally, a method and apparatus are disclosed for analyzing a user's communication activity to determine presence patterns at one or more communication devices. In addition, communications are routed to a user based on the predicted presence of the user at one or more communication devices. According to one aspect of the present invention, a user's presence at one or more communication devices is monitored over time to detect at least one pattern of behavior, often referred to herein as a presence pattern, indicating that a user is likely to be present at a given communication device during a particular time interval. The presence of a user at one or more communication devices may be detected explicitly, for example, by requiring a user to affirmatively register his or her presence information or setting a presence flag, or implicitly, for example, by observing user activity, or a combination of the foregoing.

Once a presence pattern is detected, a call that is destined for the user during the associated time interval can be automatically routed to the user at the given communication device. As a transition between each presence pattern is reached, i.e., when the user changes locations or devices, the probability of the user being present on one device decreases while the probability of the user being present on another device increases. According to another aspect of the present invention, the presence call processor can optionally send messages to multiple devices during these transitional times to ensure that the call is received by the intended recipient.

A disclosed presence pattern detection process analyzes user behavior on one or more communication devices to detect one or more presence patterns. Pattern information can be extrapolated, for example, from communications records for all of the user devices that indicate when a user answered a call. Pattern recognition techniques can be applied to call detail records to determine patterns in a user's call answering activity on each given device and thereby identify the presence patterns.

A more complete understanding of the present invention, as well as further features and advantages of the present invention, will be obtained by reference to the following detailed description and drawings.

BRIEF DESCRIPTION OF THE DRAWINGS

FIG. 1 illustrates a network environment in which the present invention can operate;

FIG. 2 is a schematic block diagram of an exemplary presence call processor of FIG. 1 incorporating features of the present invention;

FIG. 4 is a flow chart describing an exemplary implementation of a presence pattern detection process of FIG. 2;

FIG. 5 illustrates an exemplary timeline identifying a predicted presence of a user by the presence pattern detection process of FIG. 4.

DETAILED DESCRIPTION

Figure 3A:
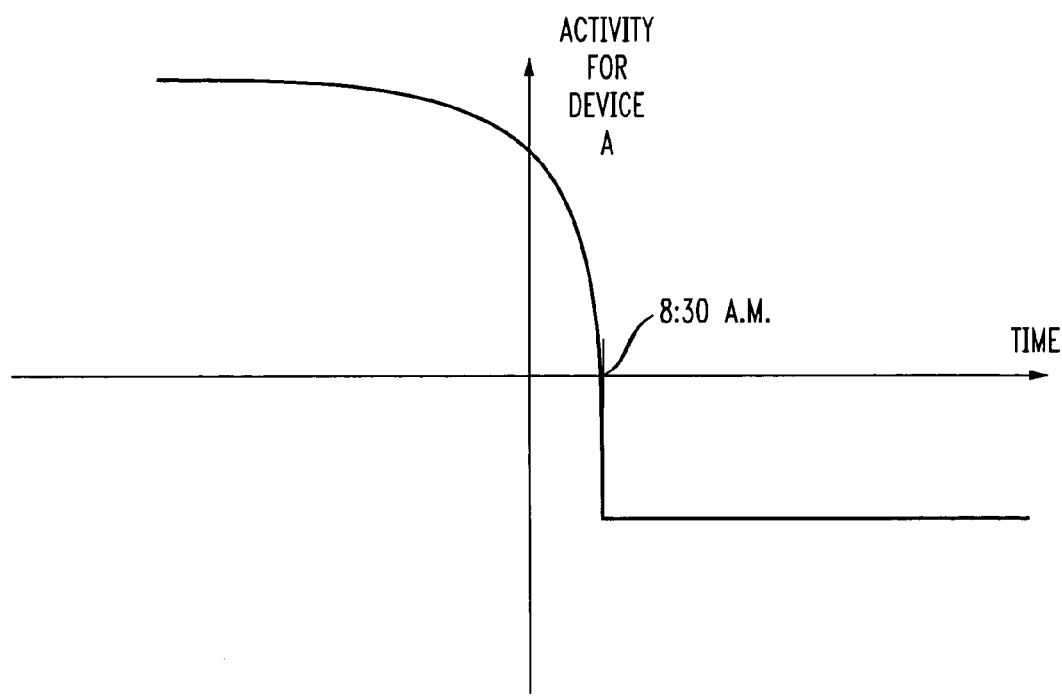
FIGS. 3A and 3B each illustrate an exemplary plot of a user's activity over time on a corresponding communication device in order to detect a pattern of behavior in accordance with the present invention.

FIG. 1 illustrates a network environment in which the present invention can operate. As shown in FIG. 1, a sender employing a sender communication device 110 desires to communicate over a network 120 with one or more intended recipients, each employing a corresponding recipient communication device 130-1 through 130-N. The communication devices 110, 130 may each be embodied as any communication device, such as a telephone, cellular telephone, computer, personal digital assistant (PDA), wireless email client, such as those commercially available from Blackberry™, or a Bluetooth-enabled device. The network(s) 120 may be any combination of public or private wired or wireless networks, such as the Internet, the Public Switched Telephone Network (PSTN) and Private Branch Exchange (PBX) switches, or a combination of the foregoing.

As used herein, the term "presence" shall mean the representation of a state characterizing the existence of an active device through which a user can communicate or through which presence can be detected. A user can have multiple, active communication devices 110, 130. The present invention provides a presence call processor 200, discussed further below in conjunction with FIG. 2, that allows a communication to be delivered to a recipient communication device 130 where a recipient is predicted to be present.

According to one aspect of the present invention, a user's presence at one or more communication devices 110, 130 is monitored over time to detect at least one pattern of behavior, often referred to herein as a presence pattern, indicating that a user is likely to be present at a given communication device 110, 130 during a particular time interval. The presence of a user at one or more communication devices may be detected explicitly, for example, by requiring a user to affirmatively register his or her presence information or setting a presence flag, or implicitly, for example, by observing user activity, such as a user login activity, keyboard or mouse activity, idle time, powering up of a device, or entering a room, or a combination of explicit and implicit techniques.

Once a presence pattern is detected, a call that is destined for the user during the associated time interval can be automatically routed to the user at the given communication device 110, 130. For example, a particular user might routinely turn on his or her cellular telephone each morning during a certain time interval, such as between 8 a.m. and 8:30 a.m., corresponding, e.g., to a time when the user is in a vehicle commuting to work. Thus, it is likely that the user will be present on the cellular telephone during this time interval and calls that are destined for the user during this interval should automatically be routed to the user's cellular telephone. Thereafter, once the user arrives in the office, it may be more likely that the user will be using his or her office telephone. The cellular telephone may actually be turned off by the user or may be out of service inside the office building. Thus, it may be likely that the user will be present on the office telephone during normal business hours, such as 8:30 a.m. until 5:00 p.m., and calls that are destined for the user during this interval should automatically be routed to the user's office telephone. It may also be observed that the user typically takes a break around 10 a.m., at which time the user generally carries a personal digital assistant (PDA) having a wireless network connection.

As a transition between each presence pattern is reached, i.e., when the user changes locations or devices, the probability of the user being present on one device decreases while the probability of the user being present on another device increases. According to another aspect of the present invention, the presence call processor 200 can optionally send messages to both devices during these transitional times to ensure that the call is received by the intended recipient.

FIG. 2 is a schematic block diagram of an exemplary presence call processor 200 of FIG. 1 incorporating features of the present invention. As shown in FIG. 2, the presence call processor 200 includes a processor 220 and related memory 230. The presence call processor 200 may be embodied as any computing device, such as a personal computer, workstation or server. In the exemplary embodiment shown in FIG. 2, the presence call processor 200 interacts with a presence proxy 210 to monitor a user's presence at one or more communication devices 110, 130 overtime.

A presence proxy 210 keeps track of all of the communication devices 110, 130 associated with a user and the current presence state of each of these communication devices 110, 130. The presence proxy 210 may be embodied, for example, in accordance with the presence proxy 210 described in United States Patent Application entitled "Programmable Presence Proxy for Determining a Presence Status of a User," U.S. Pat. Ser. No. 10/672,635, incorporated by reference herein. Generally, the presence proxy 210 can monitor a user's presence on one or more applications or portals at once (e.g., if simultaneously logged on to an IM application and to a Web portal). In this manner, the presence proxy 210 keeps track of the communication devices 110, 130 and applications that a user has available.

As shown in FIG. 2, the memory 230 of the presence call processor 200 includes a presence pattern detection process 400, discussed below in conjunction with FIG. 4, and a predicted presence call routing process 600, discussed below in conjunction with FIG. 6. Generally, the presence pattern detection process 400 observes a user's presence at one or more communication devices 110, 130 over time to detect at least one presence pattern. In addition, the predicted presence call routing process 600 routes a communication for an intended recipient based on one or more presence patterns that have been identified for the recipient.

Figure 3B:
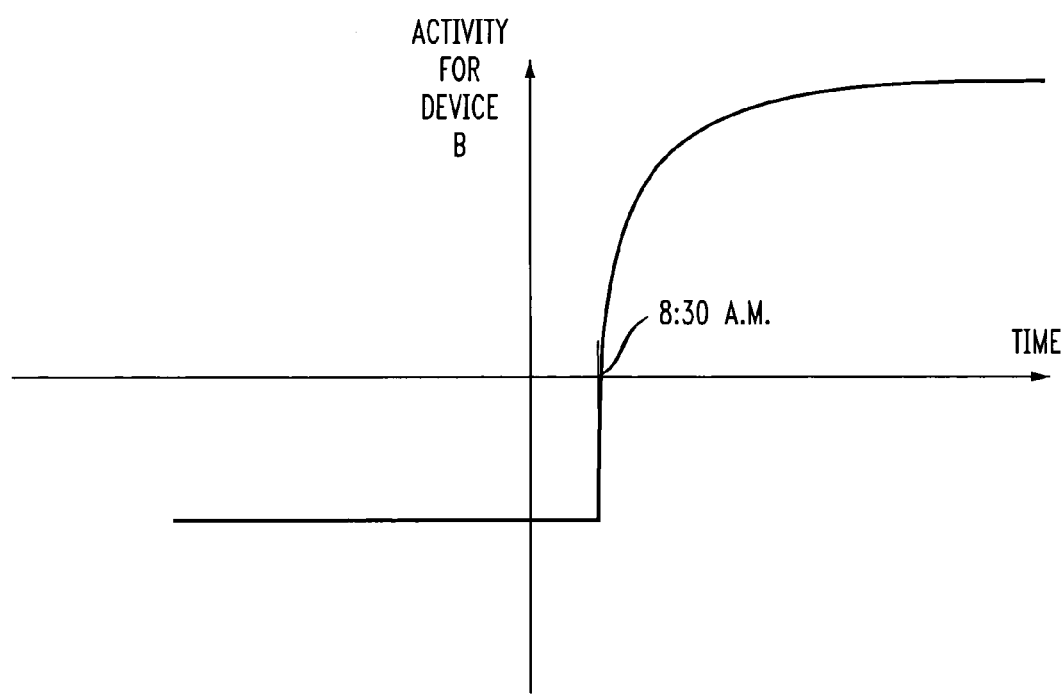

FIGS. 3A and 3B illustrate exemplary plots 300, 350 of a user's average activity over time on a corresponding communication device. The device activity may be expressed, for example, as the average number of answered/completed telephone calls handled by the device in a given time interval. Device activity can be obtained, for example, from communications records for all of the user's devices that indicate when the user answered a call or if that call went to coverage. As discussed hereinafter, the device activity plots 300, 350 are analyzed by a presence pattern detection process 400 (FIG. 4) to detect a pattern of behavior (i.e., presence patterns) in accordance with the present invention.

For example, the exemplary average user activity plot 300 shown in FIG. 3A for a particular communication device, such as a cellular telephone, indicates that the user is generally present on the device until 8:30 a.m. and then is no longer present on the device. The exemplary average user activity plot 300 shown in FIG. 3A may correspond to the above example, where the user is active on his or her cellular telephone during a commute to work. The exemplary average user activity plot 350 shown in FIG. 3B for another communication device, such as an office telephone, indicates that the user is generally present on the device after 8:30 a.m. The exemplary average user activity plot 350 shown in FIG. 3B may correspond to the above example, where the user is active on his or her office telephone during business hours.

FIG. 4 is a flow chart describing an exemplary implementation of a presence pattern detection process 400 of FIG. 2. As shown in FIG. 4, the presence pattern detection process 400 initially observes a user's behavior during step 410 on one or more communication devices over time. Generally, the presence pattern detection process 400 determines when a user is generally active on each associated communication device 110, 130.

Thereafter, the presence pattern detection process 400 analyzes the observed user behavior on one or more communication devices during step 420 to detect one or more presence patterns. Pattern information can be extrapolated, for example, from communications records for all of the devices that indicate when a user answered a call or if that call went to coverage. In one implementation, well known pattern recognition techniques are applied to call detail records to determine patterns in a user's call answering activity on each given device and thereby identify the presence patterns.

A test is performed during step 430 to determine if one or more presence patterns are detected. If it is determined during step 430 that one or more presence patterns are not detected, then program control returns to step 410 and continues in the manner described above for another user. If, however, it is determined during step 430 that one or more presence patterns are detected, then program control proceeds to step 440 where one or more rules are generated for delivering communications to this user based on the detected presence pattern(s). Continuing the above example, a rule may be defined for the user indicating that all calls for the user between 8:00 a.m. and 8:30 a.m. should first be attempted to his or her cellular telephone.

FIG. 5 illustrates an exemplary timeline 500 identifying a predicted presence of a user by the presence pattern detection process 400 of FIG. 4. Continuing the above example, the presence pattern detection process 400 has observed the behavior of the user and determined that the user is typically present on his or her cellular telephone between 8:00 a.m. and 8:30 a.m., his or her office telephone between 8:30 a.m. and 10:00 a.m.; 10:20 a.m. and noon; and 12:45 p.m. and 5:00 p.m. In addition, the user is typically present on his or her wireless-enabled personal digital assistant between 10:00 a.m. and 10:20 a.m. (which may correspond, for example, to a break time).

Figure 6:
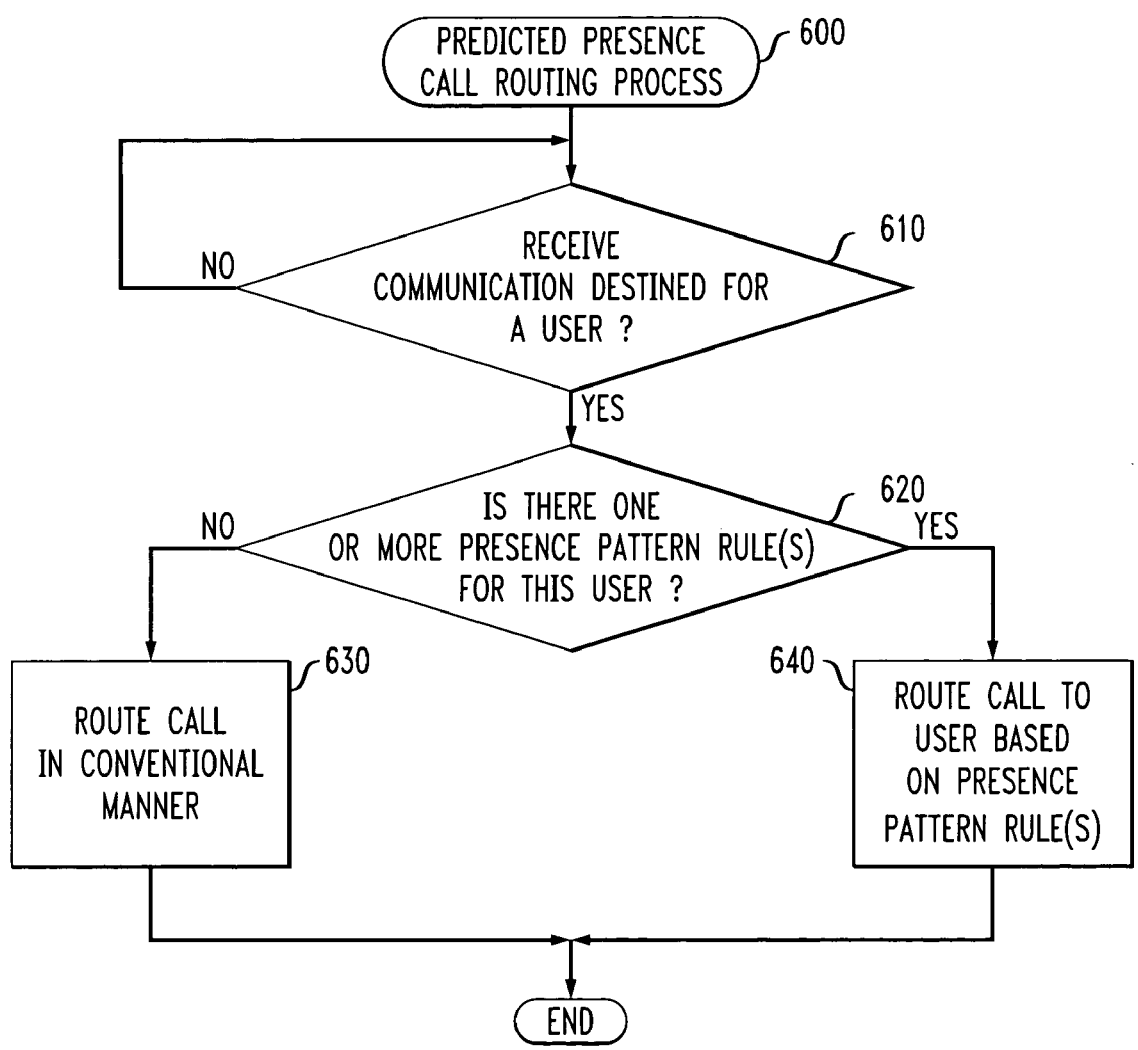
FIG. 6 is a flow chart describing an exemplary implementation of a predicted presence call routing process of FIG. 2.

FIG. 6 is a flow chart describing an exemplary implementation of a predicted presence call routing process 600 of FIG. 2. As shown in FIG. 6, the predicted presence call routing process 600 initially performs a test during step 610 to determine if a communication is received destined for a user. Once it is determined during step 610 that a communication is received destined for a user, then a further test is performed during step 620 to determine if there is one or more presence pattern rule(s) recorded for this user. If it is determined during step 620 that there are no presence pattern rule(s) recorded for this user, then the communication is routed in a conventional manner during step 630.

If, however, it is determined during step 620 that there is at least one presence pattern rule recorded for this user, then the call is routed to the user based on the recorded presence pattern rule(s) during step 640, before program control terminates.

When a user communicates on a number of devices, such as an IM client on a desktop computer, an IM client on a personal digital assistance, a cellular telephone and an office telephone, session records can be maintained for communications on each device. A user's presence pattern is obtained by analyzing, for example, the session records and the presence patterns are extrapolated. This pattern would be realized, for example, in the form of a CPL (call processing language) script that a SIP proxy might use to perform routing. For example, a rule may be stored as a CPL script to have a SIP proxy route telephone calls for a given user according to the following schedule:

8:00 am–8:30 am—ring cellular telephone only;
    8:30 am–10:00 am—ring cellular telephone and office telephone;
    10:00 am–10:20 am—send email message to PDA;
    10:20 am–12:00 am—ring office telephone only;
    12:00 am–12:45 pm—ring cellular telephone only; and
    12:45 pm–5:00 pm—ring office telephone only.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

I claim:

1. A method for routing a communication to a user, said method comprising the step of:

receiving a communication destined for said user; and routing said communication to said user based on a predicted presence of said user at a plurality of communication devices, wherein said predicted presence is based on a presence pattern indicating a probability of said user to be present on said plurality of communication devices at a given time, wherein said communication is substantially simultaneously routed to said plurality of said communication devices during a transitional time between at least two presence patterns.

2. The method of claim 1, wherein said predicted presence is recorded as a rule identifying one or more communication devices that should receive a communication during one or more time intervals.

3. The method of claim 1, wherein said presence pattern is detected by extracting presence information from one or more presence data stores.

4. The method of claim 3, wherein said presence information is obtained from a user registration process.

5. The method of claim 3, wherein said presence information is obtained by observing activities of said user.

6. The method of claim 1, further comprising the step of observing a behavior of said user over time on said one or more communication devices.

7. The method of claim 1, further comprising the step of analyzing said behavior on said one or more communication devices to detect a presence pattern.

8. The method of claim 1, wherein said predicted presence is based on a current presence state of said user on each of said one or more communication devices.

9. The method of claim 1, wherein said presence pattern is recorded as a plurality of time intervals each indicating at least one communication device where said user is predicted to be present during said corresponding time interval.

10. A method for determining a presence pattern of a user at a plurality of communication devices, said method comprising the step of:

monitoring a presence of a user at said plurality of communication devices; and detecting a pattern of behavior indicating a likelihood that a user is present at said plurality of communication devices for each of a plurality of time intervals, wherein each of said time intervals indicates at least one communication device where said user is predicted to be present during said corresponding time interval.

11. The method of claim 10, further comprising the step of recording said pattern of behavior as a rule identifying one or more communication devices that should receive a communication during one or more time intervals.

12. The method of claim 10, wherein said pattern of behavior is detected by extracting presence information from one or more presence data stores.

13. A system for routing a communication to a user, said system comprising:

a memory; and at least one processor, coupled to the memory, operative to:

receive a communication destined for said user; and route said communication to said user based on a predicted presence of said user at a plurality of communication devices, wherein said predicted presence is based on a presence pattern indicating a probability of said user to be present on said plurality of communication devices at a given time, wherein said communication is substantially simultaneously routed to said plurality of said communication devices during a transitional time between at least two presence patterns.

14. The system of claim 13, wherein said predicted presence is recorded as a rule identifying one or more communication devices that should receive a communication during one or more time intervals.

15. The system of claim 13, wherein said presence pattern is detected by extracting presence information from one or more presence data stores.

16. The system of claim 15, wherein said presence information is obtained from a user registration process.

17. The system of claim 15, wherein said presence information is obtained by observing activities of said user.

18. The system of claim 13, wherein said processor is further configured to observe a behavior of said user over time on said one or more communication devices.

19. The system of claim 18, wherein said processor is further configured to analyze said behavior on said one or more communication devices to detect a presence pattern.

20. The system of claim 13, wherein said predicted presence is based on a current presence state of said user on each of said one or more communication devices.

21. The system of claim 13, wherein said presence pattern is recorded as a plurality of time intervals each indicating at least one communication device where said user is predicted to be present during said corresponding time interval.

* * * * *

UNITED STATES PATENT AND TRADEMARK OFFICE
CERTIFICATE OF CORRECTION

PATENT NO. : 7,196,630 B2  Page 1 of 1
APPLICATION NO. : 10/672634
DATED : March 27, 2007
INVENTOR(S) : Baker It is certified that error appears in the above-identified patent and that said Letters Patent is hereby corrected as shown below:

Column 1, line 60, after "activity" and before "keyboard" replace "such as such as" with --such as--.

In claim 7, column 7, line 43, after "method of" and before "further" replace "claim 1" with --claim 6--.

Signed and Sealed this

Fourteenth Day of October, 2008

JON W. DUDAS
*Director of the United States Patent and Trademark Office*